(12) United States Patent
Sherman

(10) Patent No.: US 11,823,244 B2
(45) Date of Patent: Nov. 21, 2023

(54) EXPRESSIONS OF USERS INTEREST

(71) Applicant: eBay Inc., San Jose, CA (US)

(72) Inventor: Corinne Elizabeth Sherman, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/929,999

(22) Filed: Jul. 15, 2020

(65) Prior Publication Data

US 2020/0349627 A1 Nov. 5, 2020

Related U.S. Application Data

(63) Continuation of application No. 14/576,110, filed on Dec. 18, 2014, now Pat. No. 10,726,464.

(51) Int. Cl.
*G06Q 30/00* (2023.01)
*G06Q 30/0601* (2023.01)
*G06F 16/907* (2019.01)

(52) U.S. Cl.
CPC ....... *G06Q 30/0629* (2013.01); *G06F 16/907* (2019.01); *G06Q 30/0623* (2013.01); *G06Q 30/0631* (2013.01); *G06Q 30/0643* (2013.01)

(58) Field of Classification Search
CPC ........... G06Q 30/0629; G06Q 30/0631; G06Q 30/0623; G06Q 30/0643; G06F 16/907
See application file for complete search history.

(56) References Cited

U.S. PATENT DOCUMENTS

| | | | |
|---|---|---|---|
| 6,243,699 B1 | 6/2001 | Fish | |
| 6,266,649 B1 | 7/2001 | Linden et al. | |
| 6,298,348 B1 * | 10/2001 | Eldering | G06Q 30/02 705/36 R |
| 6,973,363 B2 | 12/2005 | Masumoto et al. | |
| 7,668,821 B1 * | 2/2010 | Donsbach | G06F 16/9535 707/765 |

(Continued)

FOREIGN PATENT DOCUMENTS

CN   103440242 A   * 12/2013

OTHER PUBLICATIONS

"E-Tailer Customization: Convenient or Creepy?" by Natasha Singer, New York Times (Late Edition, Ease Coast), New York, NY, Jun. 24, 2012 (Year: 2012).*

(Continued)

*Primary Examiner* — Anne M Georgalas
(74) *Attorney, Agent, or Firm* — Shook, Hardy & Bacon L.L.P.

(57) ABSTRACT

A system and method for personalizing user interest based on user built profiles are provided. In example embodiments, the system may include a non-transitory, computer-readable medium storing computer-executable instructions and one or more processors. When the one or more processors execute the computer-executable instructions, the processors may be configured to receive a first attribute and a second attribute describing an item of interest submitted by a user, the first attribute and the second attribute assigned to a category by the user. When the first attribute is received, the one or more processors may determine at least one shared feature between the first attribute and the second attribute, and display recommended items to the user that include the at least one shared feature.

20 Claims, 7 Drawing Sheets

(56) References Cited

U.S. PATENT DOCUMENTS

| | | | |
|---|---|---|---|
| 7,779,040 B2 | 8/2010 | Hicks | |
| 8,121,902 B1* | 2/2012 | Desjardins | G06Q 30/0601 |
| | | | 705/26.1 |
| 8,326,700 B1 | 12/2012 | Laufer et al. | |
| 8,491,384 B2 | 7/2013 | Tran et al. | |
| 8,577,753 B1 | 11/2013 | Vincent et al. | |
| 8,805,851 B2 | 8/2014 | Koike et al. | |
| 9,256,620 B2 | 2/2016 | Amacker et al. | |
| 9,355,378 B2* | 5/2016 | Williams | G06F 16/9558 |
| 9,443,209 B2* | 9/2016 | Parikh | G06Q 30/02 |
| 9,734,244 B2* | 8/2017 | Wickenkamp | G06F 16/735 |
| 9,812,022 B2* | 11/2017 | Wayman | G09B 5/02 |
| 9,959,383 B1* | 5/2018 | Bryan | G06Q 30/0251 |
| 10,726,464 B2 | 7/2020 | Sherman | |
| 2003/0039410 A1 | 2/2003 | Beeman et al. | |
| 2004/0264810 A1 | 12/2004 | Taugher et al. | |
| 2006/0167757 A1 | 7/2006 | Holden et al. | |
| 2007/0078832 A1 | 4/2007 | Ott et al. | |
| 2009/0254944 A1* | 10/2009 | Watson | H04N 21/4532 |
| | | | 725/58 |
| 2012/0084731 A1* | 4/2012 | Filman | G06F 16/51 |
| | | | 707/E17.084 |
| 2012/0096354 A1 | 4/2012 | Park et al. | |
| 2014/0025532 A1 | 1/2014 | Huang et al. | |
| 2015/0264431 A1* | 9/2015 | Cheng | H04N 21/4667 |
| | | | 725/10 |
| 2015/0302505 A1* | 10/2015 | Di | G06K 9/00362 |
| | | | 705/26.7 |
| 2015/0339759 A1 | 11/2015 | Pope et al. | |
| 2016/0034150 A1* | 2/2016 | Behr | G06F 3/0482 |
| | | | 715/771 |
| 2016/0048537 A1* | 2/2016 | Epstein | H04W 4/021 |
| | | | 705/26.7 |
| 2016/0180439 A1 | 6/2016 | Sherman | |

OTHER PUBLICATIONS

Applicant Initiated Interview Summary received for U.S. Appl. No. 14/576,110, dated Jan. 26, 2018, 3 pages.

Non-Final Office Action received for U.S. Appl. No. 14/576,110, dated Aug. 24, 2017, 34 pages.

Response to Non-Final Office Action filed on Jan. 24, 2018 for U.S. Appl. No. 14/576,110, dated Aug. 24, 2017, 97 pages.

Applicant Initiated Interview Summary Received for U.S Appl. No. 14/576,110, dated Jul. 17, 2019, 3 pages.

Applicant Initiated Interview Summary Received for U.S Appl. No. 14/576,110, dated Dec. 11, 2019, 3 pages.

Applicant Initiated Interview Summary received for U.S Appl. No. 14/576,110, dated Mar. 5, 2019, 3 pages.

Final Office Action received for U.S. Appl. No. 14/576,110, dated May 17, 2019, 26 pages.

Final Office Action Received for U.S. Appl. No. 14/576,110 dated May 16, 2018, 32 pages.

Non-Final Office Action received for U.S Appl. No. 14/576,110, dated Dec. 12, 2018, 27 pages.

Non-Final Office Action Received for U.S. Appl. No. 14/576,110, dated Sep. 30, 2019, 25 Pages.

Notice of Allowance received for U.S. Appl. No. 14/576,110, dated Mar. 18, 2020, 13 pages.

Response to Final Office Action Filed on Aug. 12, 2019, for U.S. Appl. No. 14/576,110 dated May 17, 2019, 16 pages.

Response to Final Office Action filed on Oct. 16, 2018, for U.S Appl. No. 14/576, 110, dated May 16, 2018, 16 pages.

Response to Non-Final Office Action filed on Dec. 23, 2019 for U.S. Appl. No. 14/576,110, dated Sep. 30, 2019, 15 pages.

Response to Non-Final Office Action filed on Mar. 12, 2019, for U.S. Appl. No. 14/576,110, dated Dec. 12, 2018, 18 pages.

Milicevic et al., "Social Tagging in Recommender Systems: A Survey of the State-of-the-Art and Possible Extensions", Artificial Intelligence Review, vol. 33, Jan. 21, 2010, pp. 187-209.

Nike, Inc.,"Product Presentation Assisted by Visual Search in Patent Application Approval Process", Politics & Government Week, Oct. 9, 2014, 3 Pages.

Taraghi et al., "Web Analytics of User Path Tracing and A Novel Algorithm for Generating Recommendations in Open Journal Systems", Online Information Review, vol. 37, Issue 5, 2013, pp. 672-691.

* cited by examiner

EXPRESSIONS OF USERS INTEREST

CROSS REFERENCE TO RELATED APPLICATIONS

This application is a continuation of U.S. patent application Ser. No. 14/576,110, titled "EXPRESSIONS OF USER INTEREST," filed Dec. 18, 2014. The entire contents is hereby incorporated herein.

BACKGROUND

Online shopping has grown as consumers have discovered the convenience and efficiency of shopping for specific items without having to be physically present at a store. However, online shopping suffers from the lack of ability for the user to pick and choose certain attributes from an item that the user prefers, which often results in the user having to browse through multiple shopping platforms to search for the specific item that has the attributes the user desires. Systems, devices, and methods described herein provide improved tools for identifying user interest in an item for sale based on user built categories.

BRIEF DESCRIPTION OF THE DRAWINGS

Various ones of the appended drawings merely illustrate example embodiments of the present disclosure and should not be considered as limiting its scope.

Figure 1:
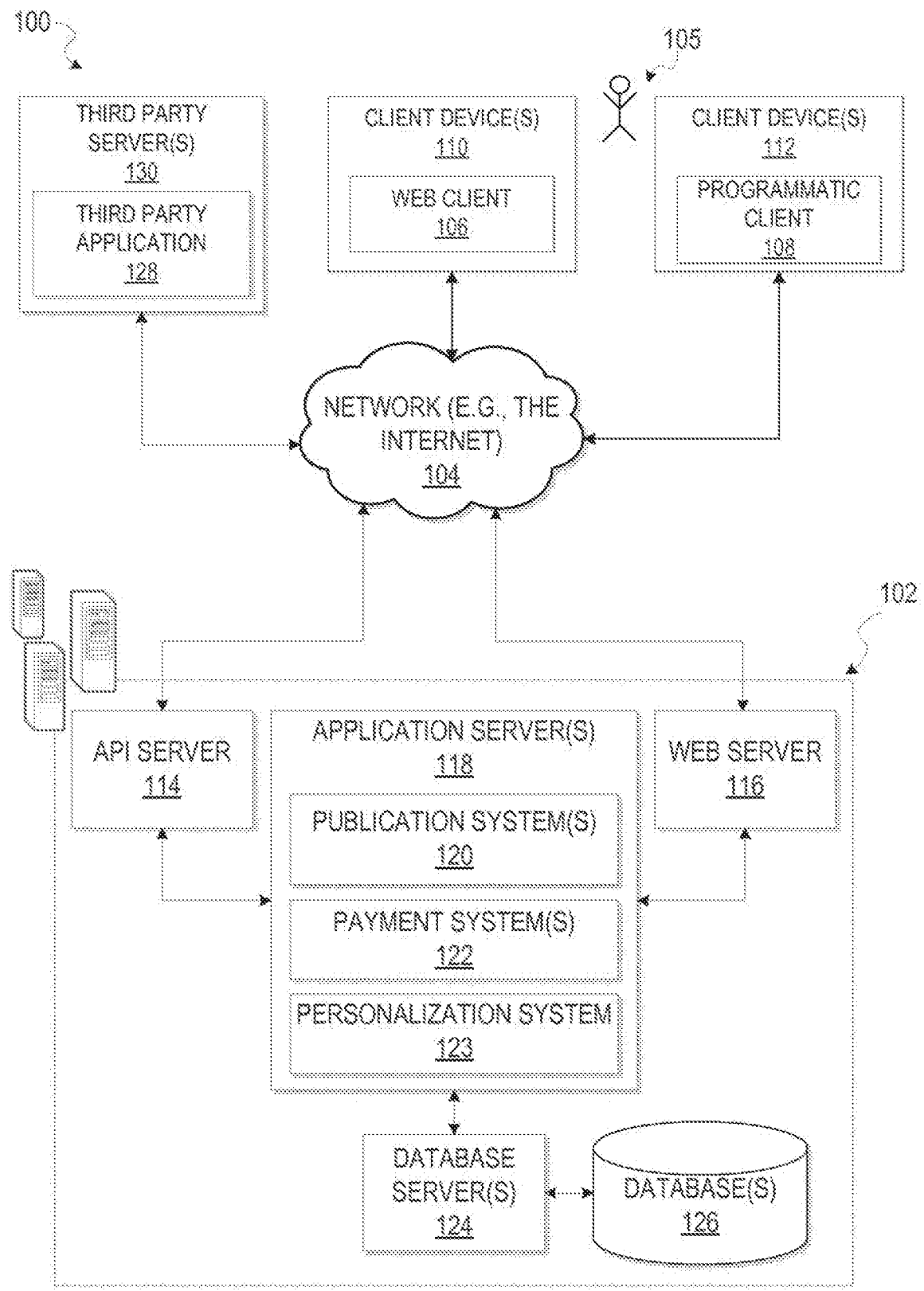
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure is directed to systems and methods for personalizing user interest based on user built profiles comprising of expressions of user interest in an item, and recommending items to the user based on the user built profiles. One of the challenges a user faces during an online shopping experience is having to know exactly the attributes the user desires in order to search for those specific attributes in a search engine. Traditionally, a user first knows exactly what they are searching for, then enters the desired attributes as search terms, or select existing filters to narrow in on the item the user desires. However, often times, a user can spot an image of an item that they like, without initially knowing what the user specifically likes about the item or which particular key features of the item the user desires, in order to conduct a traditional search. Thus, the systems and methods disclosed herein provide a mechanism by which a user built category may be deployed and, further, used to analyze the user built category to determine the attributes that the user prefers for a specific item. Moreover, the user built category can be used to recommend to the user items that have the desired features in the user built category. The system and method may be implemented as a browser extension, plug-in, layer, widget, etc. The specification below may refer to a browser plug-in, however, the implementation is not limited to only a browser plugin. The browser plug-in can be implemented on a client device 110 and 112.

The user can initially create a category, then selects and submits attributes of an item the user desires to the category while shopping. The submission can occur within a shopping session or across multiple shopping sessions. The user-selected data may include a variety of different types of information from a variety of sources. In some embodiments, the user-selected data can include textual data that the user selects by highlighting, hovering over, or otherwise indicating an interest in any word, term, or concept included in the content published on the internet. For example, while shopping for a watch, the user can first create a watch category. Next, the user can select the text on the web page describing an attribute that the user desires in a watch, such as "butterfly clasp closure," then submit the selection to the watch category. In some embodiments, the user-selected data can include a set of images that the user selects by highlighting, hovering over, boxing, or otherwise indicating an interest in any attribute or concept included in the images. For example, while shopping for a watch, the user can come across an image of a watch containing the "butterfly clasp closure" that the user desires. Next, the user can highlight the butterfly clasp closure on the watch image to indicate the user is interested in watches that contains the selected clasp closure. The user then submits the highlighted image to the watch category. Image analysis is performed on the submitted image to further determine the user's desired attribute. Subsequently, a user interface can be presented to the user, inviting the user to further specify what about the highlighted image the user desires. For example, a pop-up can be presented to the user, inquiring whether the user is selecting the "butterfly clasp closure," the color of the clasp, or the relative size or location of the clasp to the watch, etc. The user can also further specify through a text submission what specifically about the highlighted image that the user desires. After the user selects "butterfly clasp closure," the selected image and the attribute of "butterfly clasp closure" are sent to the watch category. The user-selected data can be accessed from many different sources such as e-commerce sites, social networking sites, a user device inputs, and so on. These different sources can be accessed through third-party servers 130 and user-selected data can be saved on databases 126, as shown in FIG. 1.

Identifying user interest may be achieved by analyzing data that the user selects and adds to a category. For instance, the user can browse a web page while shopping for an item, select text and/or images indicating attributes of the item that the user prefers, submit the selection to a category, continue browsing the internet and select further attributes and submit to the category, which further specifies and refines the user preferences. After submitting the attributes the user desires, the user can indicate the end of a shopping session of that category, triggering an analysis of the aggregated data. All the attributes within the category are analyzed to determine common attributes between all the selections, or common features between parts of the selections. A more common attribute indicates a higher frequency that the attribute was selected by the user. Moreover, where the selected attributes are sparse, without many common attributes among the selections, the user can specify the importance of the selections within the category. The aggregated data in the category are analyzed and the user can be provided with recommendations in response to the customized attributes added to the category in the user's profile. The browser plugin can provide data processing at near realtime, maintain activity timelines of the user-selected data, enable in-session recommendation, enable cross-session recommendation, and provide an environment for predictive model evaluation. The user-selected data can be analyzed using the personalization system 123 further discussed below.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110 and 112. FIG. 1 illustrates, for example, a web client 106 (e.g., a browser, such as the INTERNET EXPLORER browser developed by MICROSOFT Corporation of Redmond, Wash. State), and a programmatic client 108 executing on respective client devices 110 and 112.

The client devices 110 and 112 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client devices 110 and 112 may comprise a display module (not shown) to display information (e.g., in the form of user interfaces). In further embodiments, the client devices 110 and 112 may comprise one or more of a touch screens, accelerometers, gyroscopes, cameras, microphones, global positioning system (GPS) devices, and so forth. The client devices 110 and 112 may be devices of a user that are used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 105 may be a person, a machine, or other means of interacting with client devices 110 and 112. In embodiments, the user 105 is not part of the network architecture 100, but may interact with the network architecture 100 via client devices 110 and 112 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 and 112 may include one or more applications (also referred to as "apps") such as, but not limited to, a web browser, messaging application, electronic mail (email) application, an e-commerce site application (also referred to as a marketplace application), and the like. Also, each of the client devices 110 and 112 can include the browser plug-in or extension the personalization system 123. In some embodiments, if the e-commerce site application is included in a given one of the client devices 110 and 112, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in a given one of the client devices 110 and 112, the given one of the client devices 110 and 112 may use its web browser to access the e-commerce site (or a variant thereof) hosted on the networked system 102. Although three client devices 110 and 112 are shown in FIG. 1, more or less than three device machines can be included in the system 100.

One or more users 105 may be a person, a machine, or other means of interacting with the client devices 110 and 112. In example embodiments, the user 105 is not part of the network architecture 100, but may interact with the network architecture 100 via the client devices 110 and 112 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 114 and a web server 116 are coupled to, and provide programmatic and web interfaces respectively to, one or more application servers 118. The application servers 118 may host one or more publication systems 120 and payment systems 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital items information in accordance with example embodiments.

Additionally, a third party application 132, executing on third party server(s) 130, is shown as having programmatic access to the networked system 102 via the programmatic interface provided by the API server 114. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 120 may provide a number of publication functions and services to users 105 that access the networked system 102. The payment systems 122 may likewise provide a number of functions to perform or facilitate payments and transactions. While the publication system 120 and payment system 122 are shown in FIG. 1 to both form part of the networked system 102, it will be appreciated that, in alternative embodiments, each system 120 and 122 may form part of a payment service that is separate and distinct from the networked system 102. In some embodiments, the payment systems 122 may form part of the publication system 120.

The personalization system 123 may provide functionality operable to perform various personalizations using the user selected data. For example, the personalization system 123 may access the user selected data from the databases 126, the third party servers 130, the publication system 120, and other sources. In some example embodiments, the personalization system 123 may analyze the user data to perform personalization of user preferences. As more content is added to a category by the user, the personalization system 123 can further refine the personalization. In some example embodiments, the personalization system 123 may communicate with the publication systems 120 (e.g., accessing item listings) and payment system 122. In an alternative embodiment, the personalization system 123 may be a part of the publication system 120.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 120, payment system 122, and personalization system 123 could also be implemented as standalone software programs, which do not necessarily have networking capabilities.

The web client 106 may access the various publication and payment systems 120 and 122 via the web interface supported by the web server 116. Similarly, the programmatic client 108 accesses the various services and functions provided by the publication and payment systems 120 and 122 via the programmatic interface provided by the API server 114. The programmatic client 108 may, for example, be a seller application (e.g., the Turbo Lister application developed by EBAY Inc., of San Jose, Calif.) to enable sellers to author and manage listings on the networked system 102 in an off-line manner, and to perform batch-mode communications between the programmatic client 108 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102. For example, the client 105 may browse through a third party website while shopping for an item of interest. The client can select the attributes of the item to personalize the user's preference. The selection and personalization is fully described in detail below in the personalization system 123 in FIG. 2.

Figure 2:
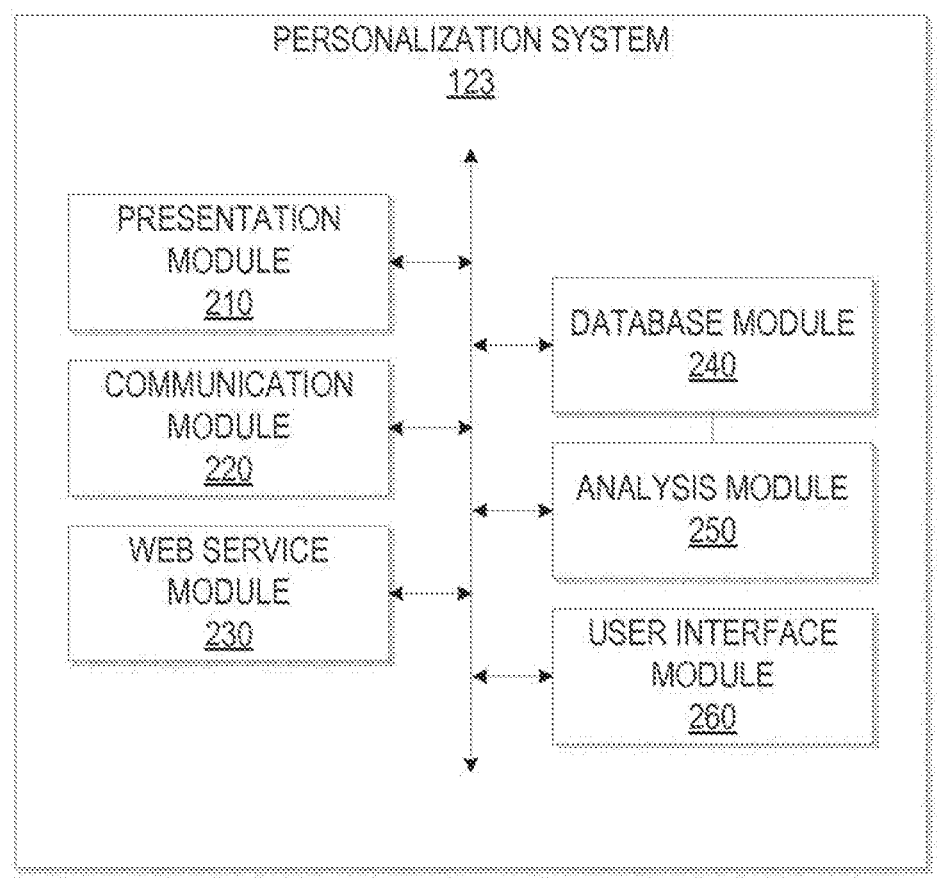
FIG. 2 is a block diagram illustrating an example embodiment of a personalization system, according to some example embodiments.

FIG. 2 is a block diagram of the personalization system 123 that may provide functionality operable to perform various personalizations using the user data. In an example embodiment, the personalization system 123 may include a user interface module 210, a network communication module 220, a web services module 230, a data module 240, and an analysis module 250. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

In some implementations, the presentation module 210 provides various presentation and user interface functionality operable to interactively present and receive information from the user. For instance, the presentation module 210 can cause presentation of various recommendations or user interfaces that make available to the user 105 an option to view recommended items that share similar features to the user-selected categories. The presentation module 210 can also present the data calculated by the analysis module 250. For instance, the presentation module 210 presents to the user the selected attributes submitted to a category. Example user interfaces presented to the user 105 at the client devices 110 and 112 can be seen in FIG. 5-FIG. 6, category selection 510 and 612. The interfaces presented at the client devices 110 and 112 are further discussed below.

In some implementations, the communication module 220 can perform various network communication functions such as communicating with networked system 102, the database servers 124, and the third party servers 130. Network communication may operate over any wired or wireless means to provide communication functionality. The communication module 220 can send updated information to the database module 240 when a user selects a feature of interest and submits it to a category. The feature of interest can consist of text descriptors describing certain attributes of an item and/or a set of images depicting certain attributes of an item indicating user interest. A user can select the feature by highlighting, hovering over, creating a box around the image or text, or otherwise indicating interest in the feature. The user can select features within a single browsing session or across multiple browsing sessions. For example, during a shopping session, a user can select textual data describing the attributes the user is specifically searching for. As shown in selected text 550 in FIG. 5, while browsing a web page, a user can select within the detailed description the words "butterfly clasp closure" and submit the selection to the "watch" category 510 to indicate user interest in watches that have a butterfly clasp closure. In addition to the selected text, the user can further select the winding stem image 520, and add the image 520 to the watch category to further indicate the style and shape of the watch the user prefers. With further additions to the "watch" category, the communication module 220 sends updated information to the database module 240 and the analysis module 250 for further refinement of the attributes the user prefers within the "watch" category. The user can continue to select and add attributes to the category over multiple different shopping sessions.

The web services module 230 may perform various web services functions such as retrieving information from third party servers 130 and application servers 118. Information retrieved by the web services module 230 may include data associated with the user 105 (e.g., user profile information from an online account, social networking data associated with the user 105, and so forth), data associated with an item (e.g., images of the item, reviews of the item, textual descriptions about the item, and so forth), and other data.

The database module 240 can perform various data functions to facilitate the functionality of the personalization system 123. For example, the database module 240 may access user-selected data corresponding to the user. The user-selected data can include a wide variety of data and can be accessed from many different sources, including the third party servers 130, the database servers 124, the marketplace system 120, the client devices 110 and 112, and so on. Also, the database module 240 provides storage for user-selected text and images stored within its respective categories.

Figure 5:
FIG. 5-6 illustrate example user interfaces, according to some example embodiments.

The analysis module 250 can perform various analyses using a variety of data to facilitate the functionality of the personalization system 123. In some embodiments, the analysis module 250 can perform an analysis of the user-selected data within a category to determine specific attributes of an item that the user prefers. For example, as shown in FIG. 5, a user while browsing a web page 500 can be searching for a watch with specific attributes that the user desires to purchase. A user can create multiple categories and submit attributes to those categories at any time after creation. The user can create a "watch category" at the beginning of a shopping session to add user-selected data indicating an attribute that the user desires. Next, the user can select certain design features describing the watch the user prefers. For example, the user may select the text "butterfly clasp closure" 550 and submits the selected text 550 to the user-created category watch 510. The analysis module 250 can perform an analysis of the user-selected text to determine that the user prefers watches with a butterfly clasp closure. Also, the user can further select more attributes to add to the "watch" category. As the user adds more attributes to the "watch" category, the analysis module 250 can perform further analysis of the aggregated attributes submitted by the user to determine the watch design that the user prefers with more specificity. For example, the user can further select the brand TORY BURCH 530, winding stem image 520, and web site EBAY 540 to further specify the design attributes of the watch that the user is seeking to purchase.

In some embodiments, the user can also select a portion of an image and submit the attribute to the category. For instance, when the user highlights a portion of an image, such as TORY BURCH image 530, the analysis module 250 can perform image analysis to determine attributes that the image contains, including but not limited to: the image contains textual data, the textual data indicates the brand TORY BURCH and the location of the brand relative to the watch as a whole. Subsequently, a user interface can be presented to the user, inviting the user to further specify what about the highlighted image the user desires. For instance, in selecting TORY BURCH image 530, the user interface module presents a selection to the user, such as a pop-up, inquiring which attributes, determined by the image analysis, the user is selecting. For example, after the image analysis of the selected TORY BURCH_image 530, the user interface module can present several selections for the user to choose to associate with the selected image: the brand TORY BURCH or the location of a brand relative to the watch. The user can also further specify through a text submission what specifically about the highlighted image that the user desires, where it differs from the available selection from the results of the image analysis. After the user selects "location of a brand relative to the watch" to indicate desire in just a brand that is located in that vicinity on the face of the watch, the selected image 630 and the attribute "location of a brand relative to the watch" are sent to the watch category. The image analysis is also performed for the selection of winding stem image 520 to further determine that the user prefers for example, the round clasp design, color, and location of the clasp relative to the watch. Also, based on the selection of website EBAY 540, the analysis module 250 can determine that the user prefers to purchase the watch through the EBAY site.

Figure 6:
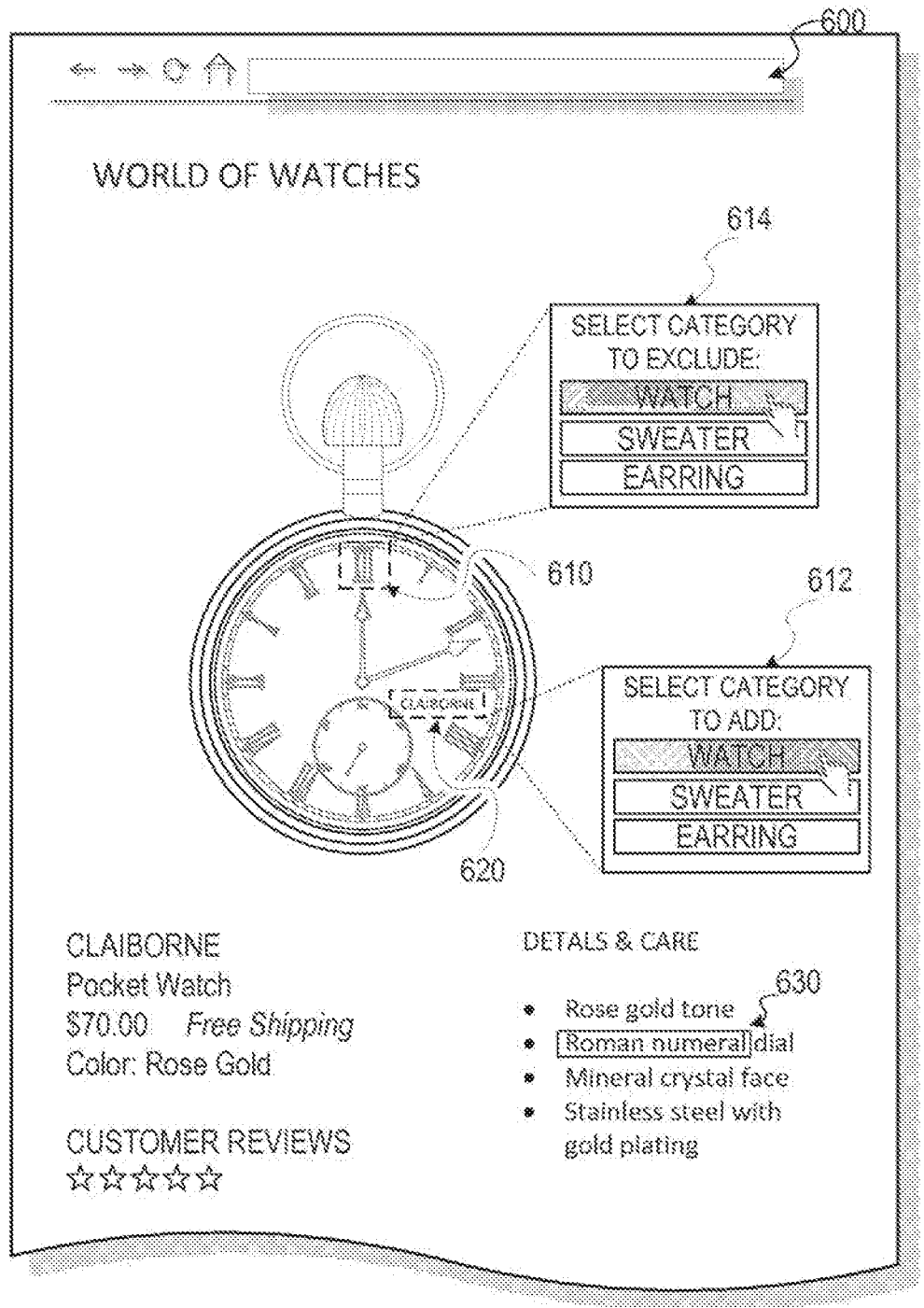

In some implementations, the user may not know in advance the exact item they are searching for while browsing a web page, but selects specific attributes as the user comes across an item that exhibits the attributes that the user prefers. The analysis module 250 can determine from the aggregated attributes, the items that the user prefers. The determination, by the analysis module 250, can be based on the items sharing the same attributes with the attributes selected by the user. Alternatively, the determination can also be an extrapolation based on the aggregated attributes, where the analysis module 250 analyzes the attributes individually and also holistically in order to extrapolate key attributes that the user prefers. For example, as shown in FIG. 5, a user can initially select the brand TORY BURCH 530 and submits the selection to the watch category. The analysis module 250 can determine individually, based on that single selection of the image, that the user may prefer watches with the brand TORY BURCH or the user prefers a watch with any brand on its face, and/or the user prefers a watch with any brand name shown within that specific location of the watch. The user can add an additional selection of the brand CLAIBORNE 620, and add the selection to the "watch" category 612, as shown in FIG. 6. With the addition of the brand CLAIBORNE 620 to the watch category containing the brand TORY BURCH the analysis module 250 is further refined, and can determine holistically that the user preference is not brand specific, but rather preference for a watch with any brand on its face, and/or preference for any brand name shown within that specific location on the face of the watch. Alternatively, the user can select attributes that the user specifically does not prefer, and submit that to the category. In response to the user indicating disapproval in an attribute, the analysis module 250 can update the determination of the user preference. For example, the user can indicate the type of watch the user desires should not have "roman numeral" dials by selecting attribute 610, and adding the selection to exclude from the watch category 614. With further selections submitted to the "watch" category 612 by the user, the analysis module 250 can more specifically determine what the user prefers in a watch.

In other implementations, the user can indicate the end of a shopping session within the category, then the analysis module 250 can analyze all the stored user-selected attributes within the category to determine common attributes between all the selections, or common attributes between portions of the selections. Each attribute is weighted by importance according to the frequency in which it has been selected and submitted to the category. A more common attribute indicate a higher frequency that the attribute was selected by the user. For example, the user can select the text "gold" twice and also select a clasp image along with indicating the color gold associated with the selected clasp image. The common trait between the three selection is the color gold, with a frequency of three separate selection. In other embodiments, where no attribute has repeated selections (no common attributes, and therefore a frequency occurrence of one) the user can rank the selections based on what the user deems is more important. The analysis module 250 can more accurately determine the user preference when the user ranks the selection that the user previously submitted to the category. The user interface module 260 can present to the user a series of two images from the category, allowing the user to select which image between the two images the user prefers. Presenting the series of two images for user ranking can allow the user to compare between all the selections available within the category. For example, in a shopping session for a shoe closet, the user submitted three images of a shoe closet that the user desires. There were no common overlap between the three images after image analysis was performed by the analysis module 250. The user interface module 260 presents image one and image two and allowing the user to select which image the user prefers. The user can, for example, select image one. Next, the user interface module 260 presents image one and image three for the user to select which image the user prefers. The user can, for example, select image three. The analysis module 250 can determine from the user ranking of the attribute selections that the order of user preference is image three, image one, then image two. Optionally, the user has the option of highlighting specifically within the ranked images to further refine and identify specifically what it is within the images that the user prefers. For example, when shopping for a shoe closet, the user had selected image three, representing a type of closet the user preferred. The user can further identify specifically what the user preferred in the closet represented by image three. The user can then highlight the shoe boxes in image three and specify that the user prefers shoe closets that can store shoe boxes. Further, the user can also highlight the shelves in image two, to specify that the user prefers the kind of shelves represented in the shoe closet of image two.

In some implementations, after the analysis module 250 has analyzed the selected data in a category to determine the key attributes the user prefers, the analysis module 250 in conjunction with the web service module 230 can use the key attributes to conduct a search for the item the user desires. Key attributes are the attributes that have been determined by the analysis module 250 to have repeated frequency of selection within a category, as described in detail above. Where there are no repeated frequency of selection within a category, the key attributes are the attributes ranked by the user to be important within a certain category, as described in detail above. There is an adjustable threshold level where an attribute is considered to be a key attribute above a certain repeat in the frequency of selection. For example, the threshold level can be set to three repeated frequency of an attribute for it to be considered a key attribute. Alternatively, where there are no repeated frequency of selection within a category, the top ranked attributes is considered key attributes above an adjustable threshold number. For example, the adjustable threshold number can be set to four highest ranked attributes, indicating that the top four highest ranked attributes is considered key attributes. The web service module 230 can search the internet using any number of search engines, and present the results of the search to the user. The user can still further refine the user preference by adding more selected data to the category and further ranking the selections as described above. Optionally, the user can choose to have the search results to be sent to them through an electronic message, such as email, for later use.

In some implementations, the user interface module 260 can provide various user interface functionality operable to interactively present and receive information from the user 105. For example, the user interface module 260 may provide a user interface configured to allow the user to create a category while shopping for an item, and selection tools to select attributes of certain items to add to the category. The selection tools can be presented using either a browser extension, plug-in, widget, etc., which can be downloaded to a browser on a user device. The types of selection tools, such as highlighting and boxing the attributes of interest, are described in detail above. Also, as described above, the user interface module 260 can present selected images for the user to rank the images according to the weight of preferences between the images. Moreover, after the image analysis of a selected image, a user interface containing the results of the data analysis of the image in addition of user input fields to allow the user to further specify what about the highlighted image the user desires. It will be appreciated that the user interface module 260 may provide many other user interfaces to facilitate functionality described herein. Presenting may mean communicating information to a device (e.g., client devices 110 and 112), the device having functionality operable to present the communicated information. Interactively presenting may mean the exchange of information from the presenting device, the user 105, and the personalization system 123.

Figure 3:
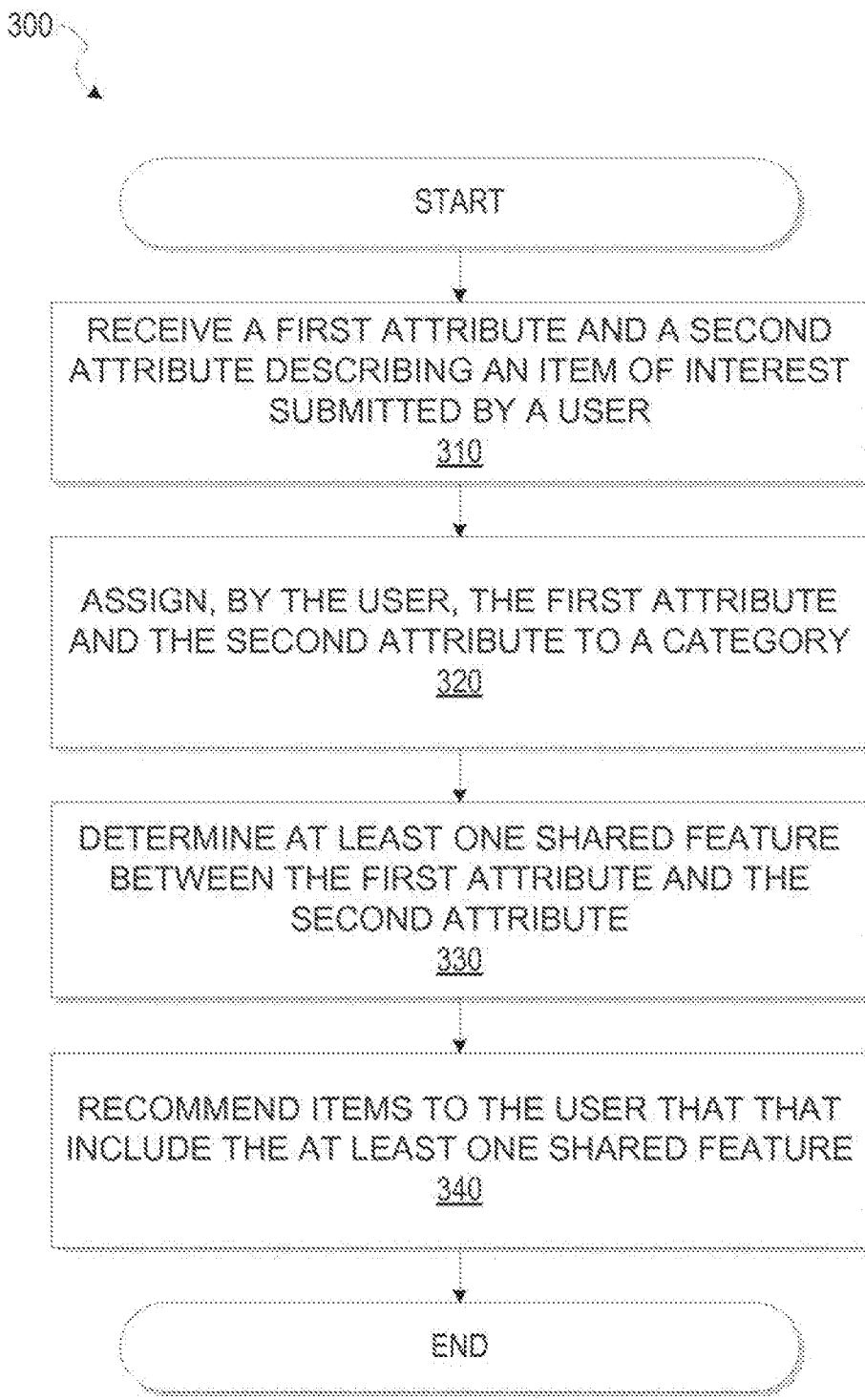
FIG. 3 illustrates in block outline some operations of an example method for personalizing a user built category, in accordance with an example embodiment.

FIG. 3 is a flowchart illustrating a method 300 in accordance with some embodiments. Some portions of the method may be performed by processing logic that may comprise hardware (e.g., dedicated logic, programmable logic, microcode, etc.), software (such as that which may be run on a general-purpose computer system or a dedicated machine), or a combination of both. The operations of the method 300 and 350 may be performed by the client device 112, client device 110, third party server 130, and database server 124). For example, the selection of an attribute of interest can be performed by a user through a browser plug-in on the client device 112. The client device 112 can also used to present to the user information sent from third party server 130 and database server 124. The third party server 130 can perform data analysis to determine user preference, as described in the analysis module 250. Also, the database server 124 can be used to store the data selected by the user indicating attributes of interest, as described in the database module 240.

The operations may be performed by modules (e.g., presentation module 210, communication module 220, web service module 230, data module 240, analysis module 250, and user interface module 260). The various operations of the method 300 and 350 may be performed in a different order and the method 300 and 350 may include only some of the operations described below. Each of these modules may comprise of processors, and processing logic.

As shown in FIG. 3, a method 300 for a personalization program, using user built categories comprises: at operation 310, receiving a first attribute and a second attribute describing an item of interest submitted by a user 105; at operation 320, assigning, by the user, the first attribute and the second attribute to a category; at operation 330, determining at least one shared feature between the first attribute and the second attribute; at operation 330, recommending items to the user include the at least one shared feature. At operation 310 and 320, the user selects and submits attributes of an item the user desires to a category while shopping. The category could be a new category the user creates with the intention of adding selected attributes of interest to that category.

Alternatively, the category could be an existing category that the user had created in a different shopping session and wants to add more attributes to that existing category to further refine the user preference. The user-selected data can include textual data that the user selects by highlighting the text to indicate an interest in any word, term, or concept included in the content published on the internet. Also, the user-selected data can include a set of images that the user selects by highlighting or boxing parts of an image to indicate an interest in any attribute or concept included in the images. The user can continue to select and add attributes to the category to further refine the user preference within that category.

In some embodiments, at operation 330, image processing is performed on the submitted images within the category to further determine the possible attributes contained in the image. After the image processing extracts the possible attributes contained in the image, those attributes can be presented to the user, inviting the user to further specify what about the highlighted image the user desires. Next, the attributes within the category are analyzed to determine common attributes between all the selections, or common features between parts of the selections. An attribute selected by the user with more frequency will result in that attribute being a common attribute between those selections. When there are no common attributes among the selections (occurring where the selected attributes are sparse, or no selections of a certain attribute with repeated frequencies), the user can specify the importance of the selections within the category by ranking the attributes. Also, the user has the option of highlighting specifically within the ranked images to further refine and identify specifically what it is within the images that the user prefers. An attribute that has a high frequency of selection would result in the common attribute between those selections. The more common the attribute shared between more selections, the more important the attribute is deemed to be in the determination of user preference. In an example embodiment, an attribute selected by the user may consist of one or more features that describes the user preference. For example, when a user selects an image of a dining room (an attribute), which includes a table, chairs, plates and bowls set out on the table, and submits that image to a living room category. Image analysis can be performed to determine that the picture consist of a table, chairs, plates, and bowls. The user is then prompted to further specify user preference from the image analysis. The user can then choose to specify that the user desires two features, the chairs and the plates in the picture. These two features are saved and associated with the dining room image. It is noted that the terms attributes and features can be used interchangeably.

In some embodiments, at operation 340, key attributes within a category are used to search the internet for items the user desires. The determination of key attributes are discussed in detail above. The search for items can be accomplished through any number of search engines. Where the user can also select where they wish to purchase the item, the search would be limited accordingly to the user preference. For example, the user can select an attribute NORDSTROM to indicate that the user only wishes to purchase the item from NORDSTROM. The results of the search can then be presented to the user. It is understood that the methods 310, 320, 330 and 340 may comprise further operations, including other aspects of functionality and features of the personalization program described herein.

Figure 4:
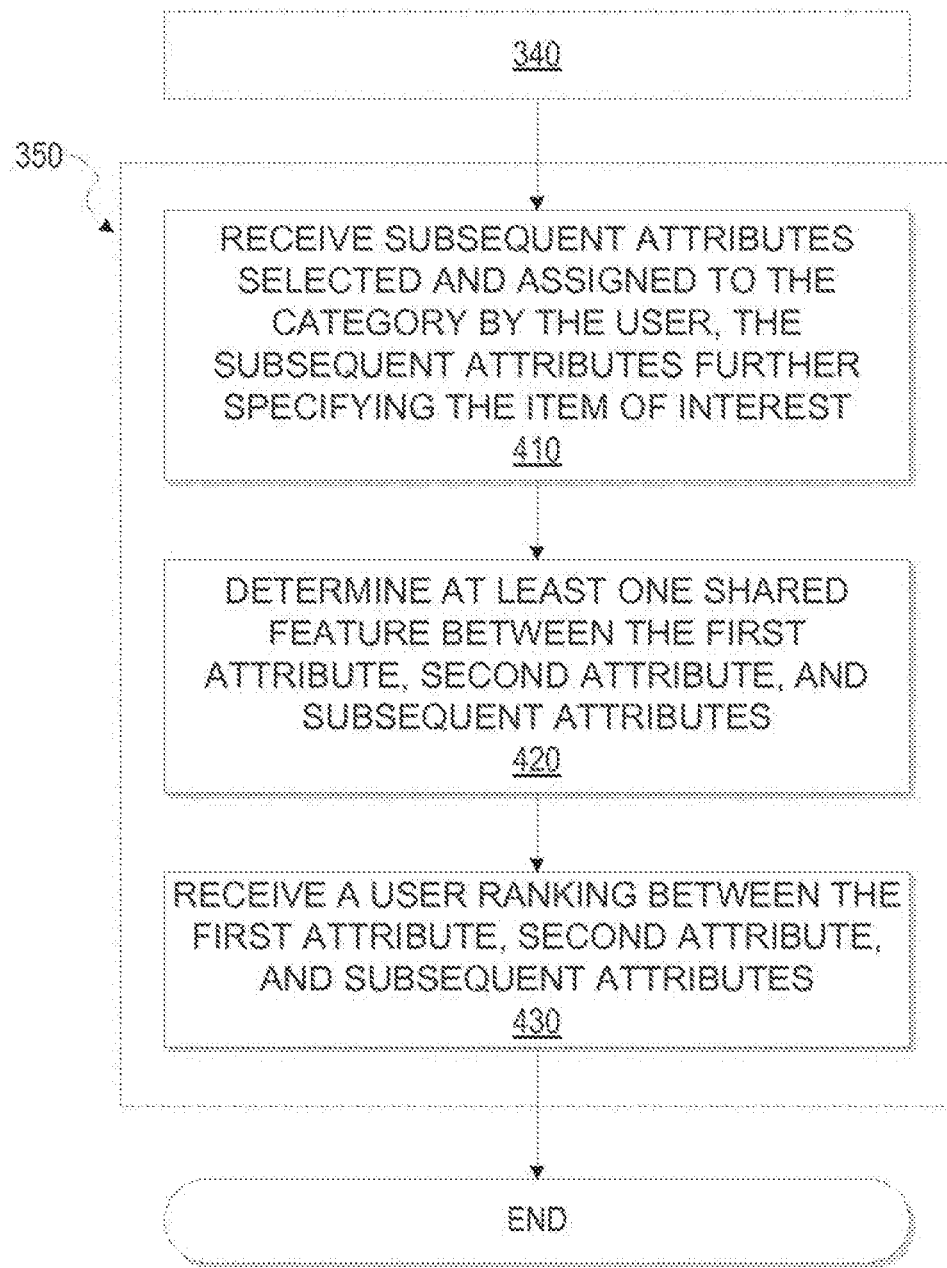
FIG. 4 illustrates in block outline some operations of an example method for personalizing a user built category, in accordance with an example embodiment.

In some embodiments, as shown in FIG. 4, at operation 410, receiving subsequent attributes selected and assigned to the category by the user, the subsequent attributes further specifying the item of interest. The subsequent attributes can occur after the first attributes, during the same shopping session, or different shopping sessions. The subsequent attributes can be used to determine more specifically what the user prefers for a specific item. For example, as described above, the user selects TORY BURCH image 530, and after image analysis, the user further specifies the attribute associate with image 530 that the user is interested in is the location of a brand relative to the watch. Subsequently, the user selects the subsequent attribute CLAIBORNE_image 620, add it to the same category as the existing image 530, and the user further specifies the attribute associate with image 620 that the user is interested in is also the location of a brand relative to the watch. At operation 420, determining at least one shared feature between the first attribute, second attribute, or subsequent attributes. For example, the attribute associate with image 530 "location of a brand relative to the watch", and the subsequent attribute associate with image 620 was also "location of a brand relative to the watch," therefore the common attribute between the two images is "location of a brand relative to the watch." At operation 430, receiving a user ranking between the first attribute, second attribute, or subsequent attributes. After the user selects and submits attributes to the category, the user can rank between all the selections based on what the user deems is more important. For instance, the user can be presented a series of two images from the category, allowing the user to select which image between the two images the user prefers. Presenting the series of two images for user ranking can allow the user to compare between all the selections available within the category. It is understood that the methods 410, 420, and 430 may comprise further operations, including other aspects of functionality and features of the personalization program described herein.

Example User Interfaces

FIGS. 5-6 depict example user interfaces for a user to interactively select attributes the user is interested. In various example embodiments, the user 105 builds categories 510 to upload specific attributes for item personalization and customization. Although FIGS. 5-6 depict specific example user interfaces and user interface elements, these are merely non-limiting examples and many other alternate user interfaces and user interface elements can be generated by the presentation module 210 and presented to the user. It will be noted that alternate presentations of the displays of FIGS. 5-6 include additional information, graphics, options, and so forth; other presentations include less information, or provide abridged information for easy use by the user.

FIG. 5 depicts an example of a user selecting attributes to add to a category during a shopping session. A user 105 can access a web page 500 and browse through items available on that web page to find an item to purchase. In various embodiments, the user interface module 260 in conjunction with the presentation module 210 causes the functionality of allowing the user to select attributes of interest on the web page 500. The user interface module 260 can allow various ways for the user to select the attributes, where the attributes can include text and images. For instance, the user can select the attributes by highlighting, hovering over, drawing a box around the text, or otherwise indicating an interest in any attribute. The user can select images that may contain textual data such as EBAY mark 540 and TORY BURCH brand 530. Moreover, the user can also select additional images of a winding stem 520, and add to a watch category 510. Each time the user selects an image or text, the user is prompted a list of categories, shown in 510, in which the user can submit the selection. Alternatively, the user can also choose to create a new category to add the selection. Also, the user can also choose to select text describing user preference and interest, and further add to the watch category 510. For example, the user can choose in addition to the winding stem image 520, the text "Butterfly clasp closure" 550 to further indicate specifically what type of clasp the user prefers in a watch. As described above, each time a user selects an image, image processing is performed on the image, then the user is prompted to further specify what about the highlighted image the user desires. The user further specifies by either selecting the options extracted from the image processing and presented to the user or by further text submission indicating the specific attribute of the picture the user desires. From the image analysis, the user is prompted whether the user is interested in the brand TORY BURCH or the location of a brand relative to the watch. The user can select that he is interested in the location of a brand relative to the watch. Also, the user can continue to choose more attributes such as the text TORY BURCH, SWISS MADE 560 to further refine user preferences. It is understood that the user interfaces in FIG. 5 may comprise further operations, including other aspects of functionality and features of the personalization program described herein.

FIG. 6 depicts another example of a user further selecting attributes to add to a category during a shopping session, according to some example embodiments. A user 105 can access a web page 600 during the same shopping session as web page 500 or a different shopping session. The user can further select and add image CLAIBORNE 620 to the watch category 612. As detailed above, when a user selects the image 620 and submits it to a category, image processing is performed on the image, then the user is prompted to further specify the attribute to associate with the image 620 that the user desires. Alternatively, the user can select attributes that the user specifically does not prefer in watch, and submit that to the category. For instance, the user can select the image 610 and indicate in the watch category 614, that the user prefers watches without roman numeral dials such as the one depicted in image 610. Further, the user can select text "Roman numeral" 630 and further specify with the text selection 630 that the user prefers watches without roman numeral dials. It is understood that the user interfaces in FIG. 6 may comprise further operations, including other aspects of functionality and features of the personalization program described herein.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
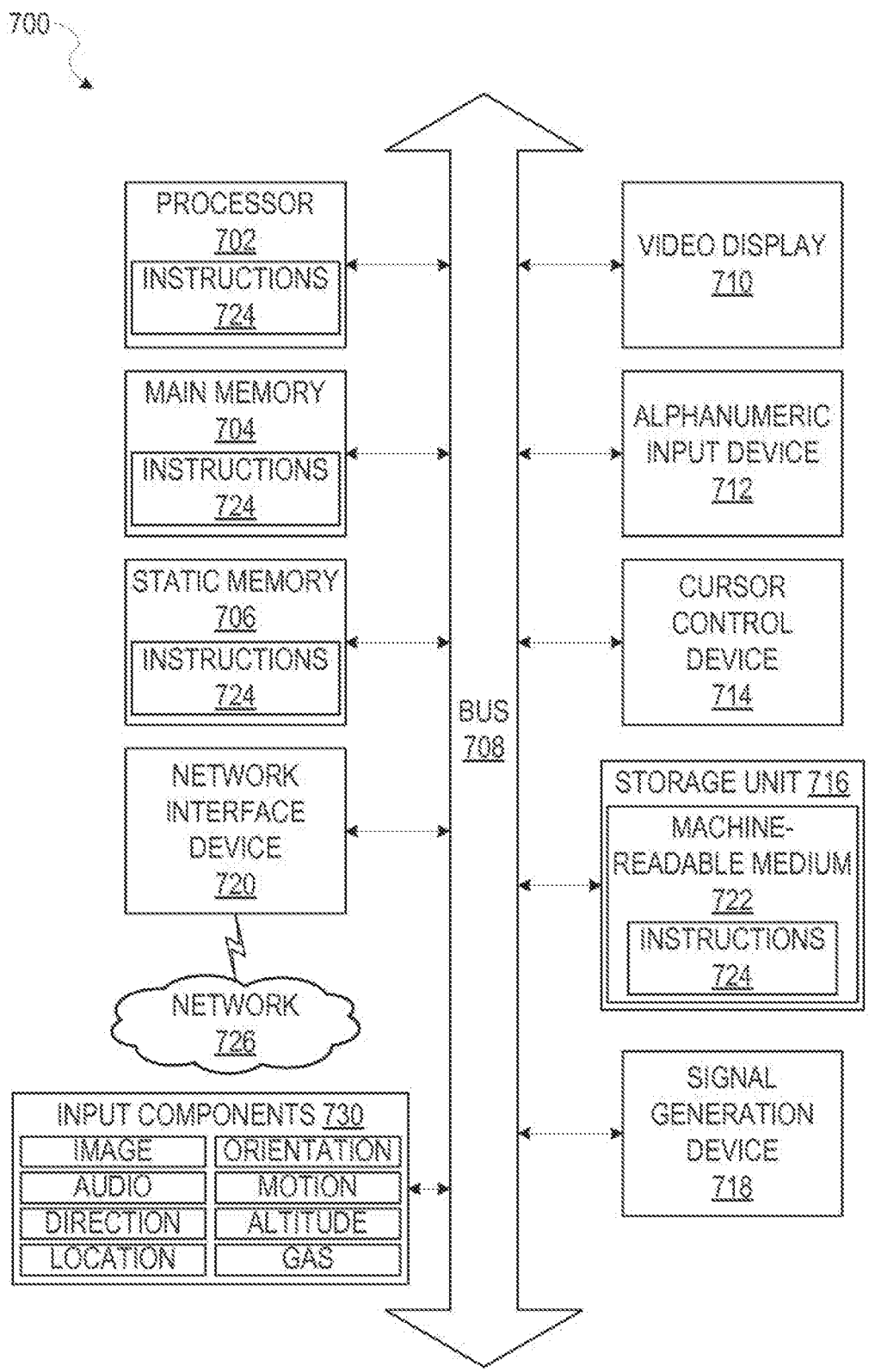
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies discussed herein may be executed. For instance, the machine 700 can perform the operations of the method 300 and method 400. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or both, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. For instance, the hardware modules can operate to perform operations of the method 400 and method 500.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized system comprising:
one or more computer processors; and
computer memory storing computer-useable instructions that, when used by the one or more computer processors, cause the one or more computer processors to perform operations comprising:
receiving a first user selection of a first feature associated with a first selectable descriptor related to a first image of a first item of interest;
adding the first feature to a user profile, wherein the user profile comprises an existing user preference associated with a plurality of items of interest of the user profile;
receiving a second user selection of a second feature associated with a second selectable descriptor related to a second image of a second item of interest;
adding the second feature to the user profile comprising the existing user preference associated with the plurality of items of interest of the user profile;
upon adding the second feature to the user profile, determining that the second feature is a shared feature that is a common feature between a first attribute associated with the first item of interest and a second attribute associated with the second item of interest;
based on determining that the second feature is the shared feature, determining that the second feature is a highest frequency feature associated with the plurality of items of interest;
determining a user preference for the second feature based on determining that the second feature is the highest frequency feature associated with the plurality of items of interest;
based on determining the user preference for the second feature, updating the user profile by integrating the second feature into the user profile as a refined user preference that replaces the existing user preference;
determining one or more recommended items associated with the refined user preference for the second feature; and
causing presentation of the one or more recommended items.

2. The system of claim 1, wherein receiving the first user selection of the first feature is based on an input received from a user and an image analysis that is performed on the first image.

3. The system of claim 1, wherein the first attribute is associated with the first selectable descriptor related to the first image and the second attribute is associated with the second selectable descriptor related to the second image.

4. The system of claim 1, wherein determining the user preference for the second feature is based on user selections made during a single browsing session or user selections made across multiple browsing sessions.

5. The system of claim 1, wherein the first user selection further indicates a feature to exclude from the user preference.

6. The system of claim 1, wherein the first selectable descriptor related to the first image is the first attribute depicted in a first portion of the first image; or wherein the first selectable descriptor related to the first image is a first text descriptor of the first attribute of the first image.

7. The system of claim 1, wherein the user preference is associated with a category in the user profile.

8. One or more hardware computer-storage media having computer-executable instructions embodied thereon that, when executed by a computing system having a processor and memory, cause the processor to perform operations comprising:
receiving a first user selection of a first feature associated with a first selectable descriptor related to a first image of a first item of interest;
adding the first feature to a user profile, wherein the user profile comprises an existing user preference associated with a plurality of items of interest of the user profile;
receiving a second user selection of a second feature associated with a second selectable descriptor related to a second image of a second item of interest;

adding the second feature to the user profile comprising the existing user preference associated with the plurality of items of interest of the user profile;

upon adding the second feature to the user profile, determining that the second feature is a shared feature that is a common feature between a first attribute associated with the first item of interest and a second attribute associated with the second item of interest;

based on determining that the second feature is the shared feature, determining that the second feature is a highest frequency feature associated with the plurality of items of interest;

determining a user preference for the second feature based on determining that the second feature is the highest frequency feature associated with the plurality of items of interest;

based on determining the user preference for the second feature, updating the user profile by integrating the second feature into the user profile as a refined user preference that replaces the existing user preference;

determining one or more recommended items associated with the refined user preference for the second feature; and causing presentation of the one or more recommended items.

9. The media of claim 8, wherein receiving the first feature is based on an input received from a user and an image analysis that is performed on the first image.

10. The media of claim 8, wherein the first attribute is associated with the first selectable descriptor related to the first image and the second attribute is associated with the second selectable descriptor related to the second image.

11. The media of claim 8, wherein determining the user preference for the second feature is based on user selections made during a single browsing session or user selections made across multiple browsing sessions.

12. The media of claim 8, wherein the first user selection further indicates a feature to exclude from the user preference.

13. The media of claim 8, wherein the first selectable descriptor related to the first image is the first attribute depicted in a first portion of the first image; or wherein the first selectable descriptor related to the first image is a first text descriptor of the first attribute of the first image.

14. The media of claim 8, wherein the user preference is associated with a category in the user profile.

15. A computer-implemented method, the method comprising:

receiving a first user selection of a first feature associated with a first selectable descriptor related to a first image of a first item of interest;

adding the first feature to a user profile, wherein the user profile comprises an existing user preference associated with a plurality of items of interest of the user profile;

receiving a second user selection of a second feature associated with a second selectable descriptor related to a second image of a second item of interest;

adding the second feature to the user profile comprising the existing user preference associated with the plurality of items of interest of the user profile;

upon adding the second feature to the user profile, determining that the second feature is a shared feature that is a common feature between a first attribute associated with the first item of interest and a second attribute associated with the second item of interest;

based on determining that the second feature is the shared feature, determining that the second feature is a highest frequency feature associated with the plurality of items of interest;

determining a user preference for the second feature based on determining that the second feature is the highest frequency feature associated with the plurality of items of interest;

based on determining the user preference for the second feature, updating the user profile by integrating the second feature into the user profile as a refined user preference that replaces the existing user preference;

determining one or more recommended items associated with the refined user preference for the second feature; and causing presentation of the one or more recommended items.

16. The method of claim 15, wherein receiving the first user selection of the first feature is based on an input received from a user and an image analysis that is performed on the first image.

17. The method of claim 15, wherein the first attribute is associated with the first selectable descriptor related to the first image and the second attribute is associated with the second selectable descriptor related to the second image.

18. The method of claim 15, wherein determining the user preference for the second feature is based on user selections made during a single browsing session or user selections made across multiple browsing sessions.

19. The method of claim 15, wherein the first user selection further indicates a feature to exclude from the user preference.

20. The method of claim 15, wherein the first selectable descriptor related to the first image is the first attribute depicted in a first portion of the first image; or wherein the first selectable descriptor related to the first image is a first text descriptor of the first attribute of the first image.

* * * * *